United States Patent
Masuyama

(10) Patent No.: US 6,795,238 B2
(45) Date of Patent: Sep. 21, 2004

(54) ELECTRONIC CAMERA FOR MICROSCOPE

(75) Inventor: Hideyuki Masuyama, Hachioji (JP)

(73) Assignee: Olympus Optical Co., Ltd., Tokyo (JP)

(*) Notice: Subject to any disclaimer, the term of this patent is extended or adjusted under 35 U.S.C. 154(b) by 0 days.

(21) Appl. No.: 09/912,899

(22) Filed: Jul. 25, 2001

(65) Prior Publication Data

US 2001/0045506 A1 Nov. 29, 2001

Related U.S. Application Data

(62) Division of application No. 09/203,638, filed on Dec. 1, 1998.

(30) Foreign Application Priority Data

| Dec. 2, 1997 | (JP) | ................................. 9-332215 |
| Jul. 2, 1998 | (JP) | ............................ 10-187501 |

(51) Int. Cl.[7] ............................................. G02B 21/00
(52) U.S. Cl. ....................................... 359/368; 359/363
(58) Field of Search ................................. 359/363, 368, 359/381, 379, 385; 382/133

(56) References Cited

U.S. PATENT DOCUMENTS

| 4,661,692 A | * 4/1987 | Kawasaki ................. 250/201.2 |
| 4,736,241 A | * 4/1988 | Murakami et al. ........ 348/225.1 |
| 5,134,662 A | 7/1992 | Bacus et al. |
| 5,481,401 A | 1/1996 | Kita et al. |
| 5,548,661 A | 8/1996 | Price |
| 5,703,714 A | 12/1997 | Kojima ........................ 359/368 |
| 5,933,513 A | 8/1999 | Yoneyama |
| 2003/0016301 A1 | 1/2003 | Aizaki et al. ............... 348/345 |

FOREIGN PATENT DOCUMENTS

| JP | 04-328712 | 11/1992 | |
| JP | 08-211295 | 8/1996 | |
| JP | 08254657 A | * 10/1996 | ........... G02B/21/36 |
| JP | 10-307262 | 11/1998 | |
| JP | 11-084262 | 3/1999 | |
| JP | 2000-083184 | 3/2000 | |

OTHER PUBLICATIONS

U.S. patent application Ser. No. 09/483,521 filed Jan. 14, 2000; Inventors: Hideyuki Masuyama et al; Title: Image Sensor Apparatus for Microscope.

* cited by examiner

*Primary Examiner*—Drew A. Dunn
*Assistant Examiner*—Joshua L Pritchett
(74) *Attorney, Agent, or Firm*—Frishauf, Holtz, Goodman & Chick, P.C.

(57) ABSTRACT

An electronic camera for a microscope includes an imaging element for imaging an optical image split by an optical path split prism, a signal processing section for processing an imaging signal output from the imaging element, a memory section for recording image data based on the imaging signal processed by the signal processing section, an LCD monitor located near the eyepiece lens for displaying the image based on the imaging signal processed by the signal processing section, and a casing integrally containing all of the imaging element, the signal processing section, the memory section, and the LCD monitor.

4 Claims, 11 Drawing Sheets

ELECTRONIC CAMERA FOR MICROSCOPE

This is a divisional of application Ser. No. 09/203,638, filed Dec. 1, 1998.

BACKGROUND OF THE INVENTION

This invention relates to a microscope system including an electronic camera for electronically obtaining an image observed by a microscope.

As digital techniques have developed, digital photographing has begun to be widely used in the field of a microscopy in recent years. Digital photographing does not require a developing process and thus is advantageous in easily obtaining a photograph as compared with silver salt film photographing. Digitally photographed data, moreover, can be stored as data in a personal computer or the like, and this will never be deteriorated as a negative silver salt film. Further, in the case of silver salt film photographing a specific space needs to be provided for storing the film.

The conventional digital photograph has not been as good as a silver salt film in image quality, and thus has not been used very much. But with developments in the quality of an imaging element (CCD), the image quality of digital photographing has been improved to be equal to that of the silver salt film photograph, and thus will be widely spread in the field of microscopy.

An example of the electronic camera (digital camera) used for the conventional microscope is shown in FIG. 1. Conventionally, a microscope body 1 is provided with a tri-metrogan barrel 10, and an observer 90 observes an image via a binocular eye-piece barrel 20. The tri-metrogan barrel 10 has another optical path (port) at an upper portion, and obtains a photograph image or a television monitor image using the port.

The port is fixed to an adapter 30 for a television camera, and the adapter 30 is fixed to a CCD camera 80. An electronic camera is approximate in structure to a CCD video camera used for a television monitor, and thus not the normal camera adapter but an adapter for a television camera is frequently used. The television camera adapter 30 is a barrel-shaped unit containing an optical system for relaying an image output from the tri-metrogan barrel 10 to a CCD device in the CCD camera 80 to correctly image in the CCD device.

A signal output from the CCD camera 80 is sent to a television monitor 81 through a cable, and the image can be monitored thereby. The final framing or focusing of the obtained photograph is performed while watching a monitor 81. When the CCD camera 80 is connected not to the television monitor 81 but to a personal computer 82, the image can be directly stored as a file in a personal computer 82. The CCD camera 80 connected to a personal computer 82 can be operated with use of the personal computer 82 through a key board 83. When the CCD camera 80 is connected to the monitor 81, the CCD camera 80 is operated by a handswitch 51 provided thereto. The obtained photograph is stored in a memory device in the CCD camera 80, and can be input into the personal computer by some method, or when the CCD camera 80 is connected to the personal computer, the obtained photograph is directly sent to the personal computer 82 to be stored in a memory device in the personal computer 82.

The conventional electronic camera used for the microscope has a problem that the microscope electronic camera has so many systems that a large space is occupied thereby. A microscope that is used for various applications is also connected to various peripheral apparatuses, which results in disorder on a desk and occupation of a large space. When the apparatuses such as the handswitch 51, the personal computer 82, and the key board 83 are further added thereto, the operability on the desk will become worse, of course. In order to obtain an image from the microscope, however, at least the television monitor 81 must be located near the microscope. In other words, if the television monitor 81 cannot be located near the microscope due to the short of the space on the desk, the framing or focusing in photographing cannot be performed normally.

Further, the conventional microscope electronic camera is constituted of many components, and thus has poor flexibility in terms of compatibility and mobility. In such cases, all the components such as the television monitor 81, the personal computer 82, and the key board 83 must be carried to be used with the microscope electronic camera.

There is another problem in the electronic camera: the configuration cost of the system. The electronic photograph cannot be obtained only with use of the CCD camera 80 and the handswitch 51. A user must buy expensive apparatuses such as the television monitor 81 or the personal computer 82 only to perform the framing or the focusing.

On the other hand, in observing a specimen with use of a microscope, the microscope will be provided with various filters or optical elements suitable for the object of the observation. When the image obtained by the observation by a microscope is not photographed by an electronic camera, image processings corresponding to the filter or optical element to be executed for the image signal are obtained by the electronic camera, in order to obtain a suitable image.

In the white balance correction example of image processing, when a light amount of the illumination light to be applied to the specimen is adjusted to observe a specimen with a light amount suitable for the observation, the white balance correction needs to be executed so as to obtain a predetermined white balance free from the color temperature change of the illumination light due to the light amount adjustment. Accordingly, every time that the color temperature change of the illumination light occurs due to the insertion/extraction of the filter on the optical path of the illumination light or change the light amount of the illumination light source, the white balance is reset therefor to suitably observe the specimen.

On the other hand, there has been proposed a technique of preparing correction data for the white balance correction in initializing the microscope, as disclosed by the Japanese Patent KOKAI Application No. 6-351027, for example. According to this technique, the spectral transmission characteristics is measured on the basis of the image signal obtained by the imaging element while varying the light amount of the illumination light source and serially inserting/extracting filters used therefor, thereby the white balance correction data is prepared from all the combination of the light amounts of the illumination light source and the filters in initializing the microscope. In observing the specimen, the white balance is executed on the basis of the white balance correction data corresponding to the light amount of the illumination light source and the condition of the filter in that time.

However, the technique of executing the white balance on the basis of the white balance correction data can be only used when the microscope is used for the transmission observation. It is difficult to prepare such white balance correction data in projection observation. Accordingly, the specimen cannot be always photographed under the suitable correction. Further, the measurement is performed through the image processing system, and thus the correction data does not always correspond to a suitable correction amount corresponding to the illumination light color temperature. Recently, there has been further proposed a microscope capable of controlling an entire microscope system such as the setting of observation method, as disclosed in the Japanese Patent KOKAI Application No. 7-199077. According to such a microscope, however, the observer must executes a plenty of processings in accordance with the observation condition such as an observation method in order to obtain a suitable image.

The object of the present invention is to provide an electronic camera for a microscope, which occupies a small space, which comprises components of a reasonable cost, and which can obtain a digital photograph with ease.

The other object of the present invention is to provide an electronic camera for a microscope, which can obtain an optimum image in accordance with an observation condition of the microscope and a specimen.

BRIEF SUMMARY OF THE INVENTION

The above-mentioned problems can be solved by the electronic camera for a microscope as described below.

The present invention is an electronic camera attached to a microscope, which integrally includes an imaging element, a signal processing section for processing a signal from an imaging element, a memory for recording photographed image data, and a display for displaying an image obtained by the imaging element.

With such a structure, in the microscope electronic camera according to the present invention, the signal from the imaging element is processed by the signal processing section, and displayed by the display integrally provided thereto. Accordingly, by operating while watching the image of the display means, digital photographing can be attained without providing television monitor or personal computer independent therefrom.

The above-mentioned problems can be overcome by the following microscope electronic camera. More specifically, a microscope electronic camera which is attached to a microscope having a function of setting the observation condition of a specimen and which attains an observation image of the specimen by an imaging element comprises:

a recognizing section which when setting of the observation condition in the microscope is changed, recognizes the information the setting of which is changed, and a signal processing section for processing an image signal output from the imaging element in accordance with information sent from the recognizing section.

According to such a structure, the optimum image can be attained in accordance with the observation of the microscope or the specimen.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION (First Embodiment)

Figure 2:
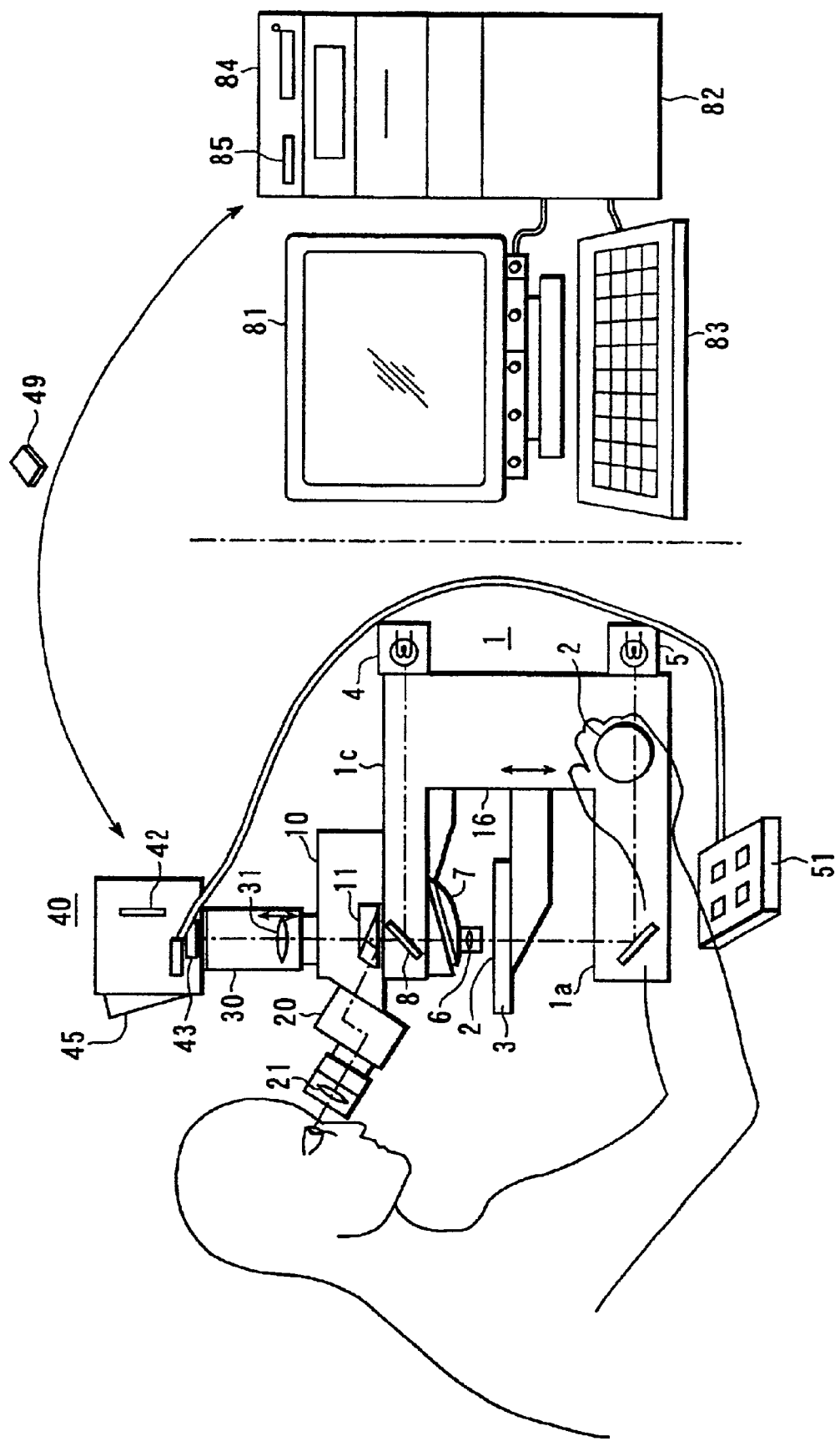
FIG. 2 is a view showing an electronic camera and a microscope according to the first embodiment of the present invention.

As shown in FIG. 2, an electronic camera 40 is attached to a microscope body 1 through an adapter 30 for a television camera. In front of the electronic camera 40, an LCD color monitor 45 for monitoring the image obtained by the microscope is arranged along the line of the sight of an observer 90. The observer 90 watching the image through the eyepiece lens 21 can perform the framing or focusing operation in photographing merely by looking upward a little to watch the image displayed in the LCD color monitor 45, and can obtain a digital photograph by handling the handswitch 51.

The first embodiment of the present invention will be described below more specifically. As shown in FIG. 2, the microscope body 1 is formed to have a rectangular recess on a side wall, and has a base section 1a, a column section 1b, an arm section 1c. A stage 3 for mounting a specimen S thereon through a focusing mechanism is supported by the column section 1b to be movable vertically. The focusing mechanism is operated with use of a focusing handle 2 to focus the specimen S. The arm section 1c and the base section 1a are respectively provided with a transmission light optical system and a projection light optical system for illuminating the specimen S with light from light sources 4 and 5. On the bottom face of the arm section 1c, a revolving revolver 7 capable of being attached with a plurality of objective lenses 6 is arranged to arbitrarily switch the objective lenses 6. On the upper face of the arm section 1c, a tri-metrogan barrel 10 containing an optical path split prism (beam splitter) 11 is attached. On a front face of the tri-metrogan barrel 10, an eye-piece barrel 20 containing an eyepiece lens 21 is attached, and on an upper face of the tri-metrogan barrel 10, an electronic camera 40 is attached via a television camera adapter 30. The observation light from an objective lens 6 is imaged in a CCD 43 as an imaging element in the electronic camera 40 by an imaging lens 31 in the television camera adapter 30. The television camera adapter 30 is provided with a focal point adjusting mechanism for adjusting the imaging lens 31 along an optical axis. By adjusting the imaging lens 31 in this manner, the imaging position can be adjusted.

Figure 1:
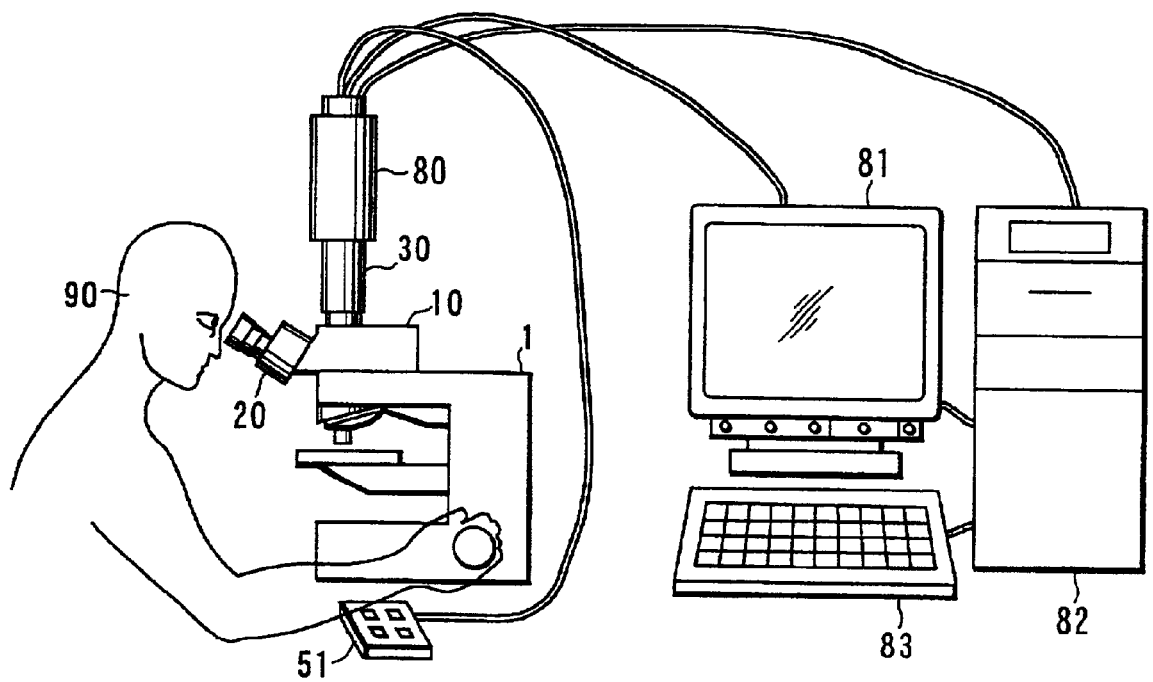
FIG. 1 is a view showing a microscope photograph system according to the conventional electronic camera.
Figure 3A:
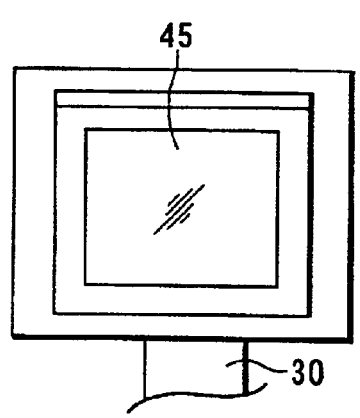
FIGS. 3A and 3B are respectively front view and side view of the electronic camera.
Figure 3B:
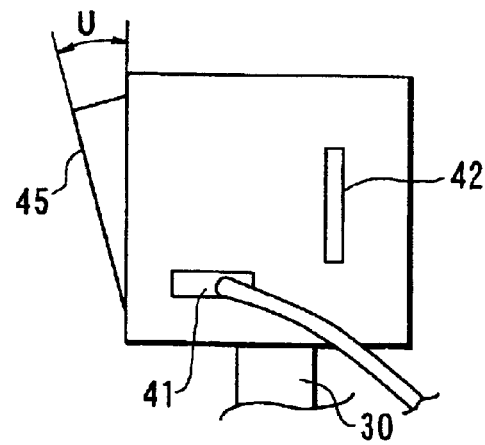
Figure 4:
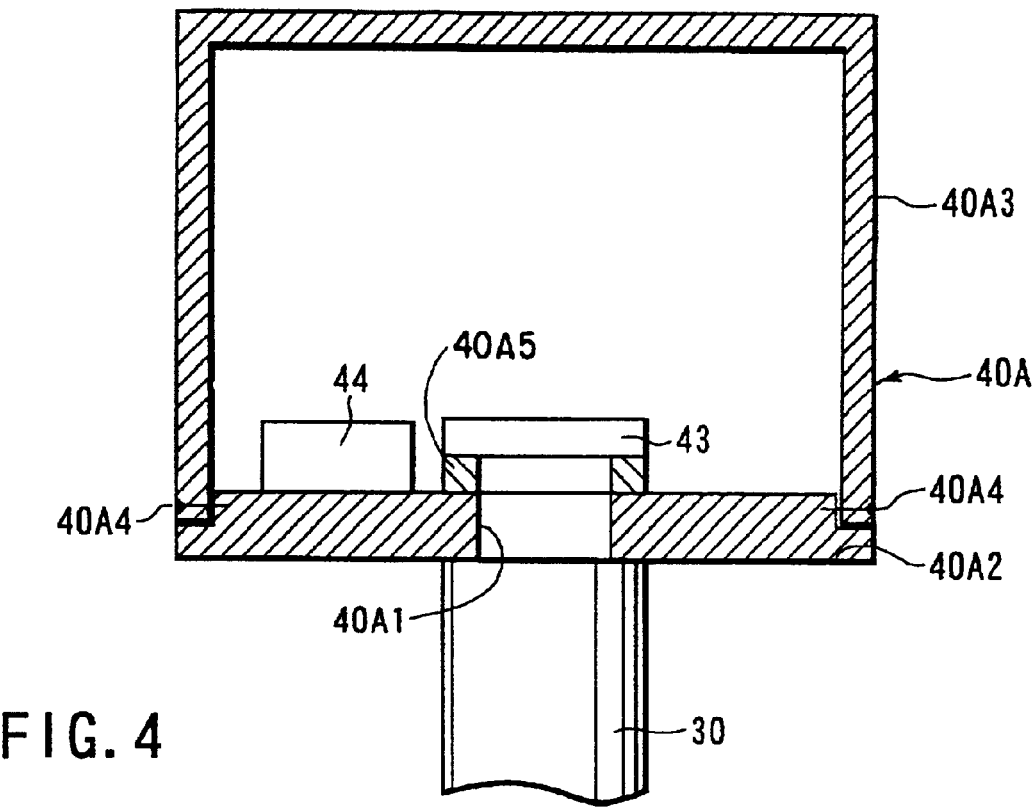
FIG. 4 is a sectional view of the electronic camera.

The electronic camera 40 is shown in FIGS. 3A, 3B, and 4. An LCD color monitor 45 is arranged in a casing 40A so as to be positioned near the eyepiece lens 31. More specifically, the LCD color monitor 45 is formed integrally with a front face (a face on the side of the observer 90) of the casing 40A to be provided along the line of the sight of the observer 90 such that the display face is inclined. The inclination angle U of the display face is set within a scope from 5 or 10 to 25 degree. According to the system of the present embodiment, the angle is set at 15 degree as the most preferable angle for improving the easiness of the image observation or the operability of the switch and the like. The casing 40A is formed by fixing a box 40A3 to a bottom plate 40A2 having a hole 40A1 for introducing the optical image from the adapter 30, with a screw 40A4. On the outer right side face of the casing 40A, a terminal 41 for connecting the handswitch and a slot 42 for inserting a memory card for storing the image data are provided. In the casing 40A, the CCD 43 as an imaging element and a signal processing section 44 for processing the output signal from the CCD, and the like are arranged. Reference numeral 40A5 denotes a spacer for supporting the CCD 43.

Figure 5:
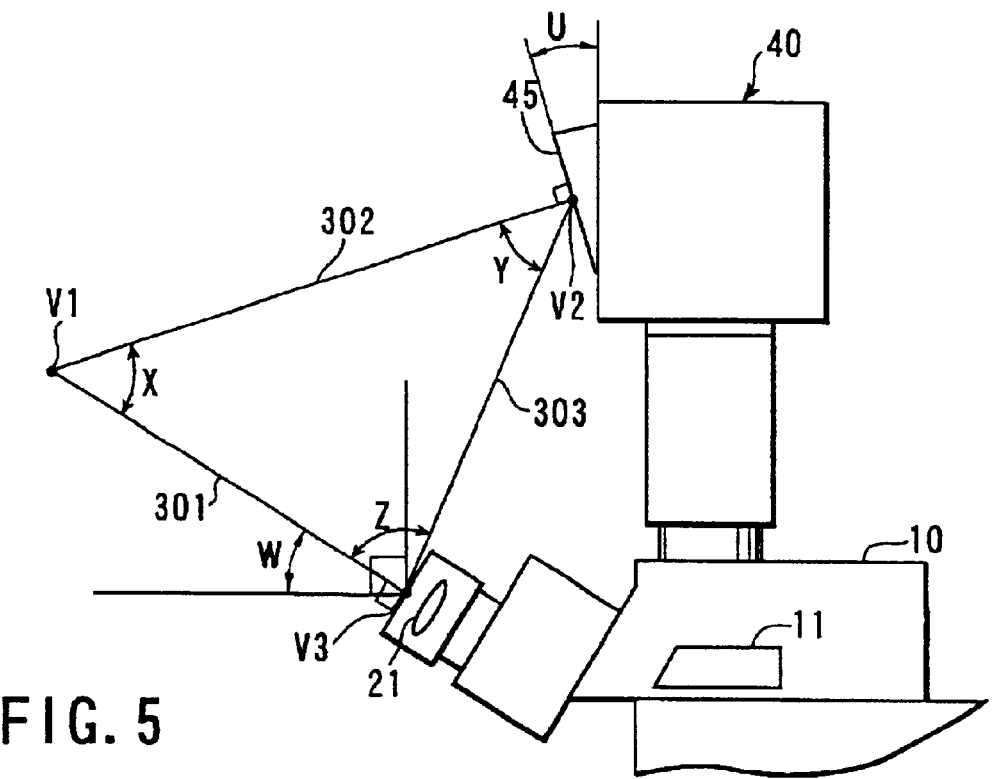
FIG. 5 is a view showing the relationship between the eyepiece lens of the microscope and the display face of the electronic camera.

In this drawing, the LCD color monitor 45 is arranged near the eyepiece lens 31. However, the eyepiece lens 21 and the LCD color monitor 45 of the electronic camera 40 are arranged as shown in FIG. 5 in view of the easiness of the image observation and the operability of the switch and the like. The inclination angle W of the eye-piece barrel 20 is set within a scope from 20 or 30 to 45 degree. The inclination angle U of the display face is set within a scope from 5 or 10 to 25 degree (15 degree in the system of the present embodiment), as mentioned before. In a triangle formed by connecting a first point V1 at which an optical axis 301 (axis along the line of the sight of the observer 90) of the eyepiece lens 21 crosses an axis 302 perpendicular to the display face of the LCD color monitor. 45, a second point V2 at which the display face of the LCD color monitor 45 crosses the axis 302, and a third point V3 on the eyepiece lens 21, when an angle X is formed by the optical axis 301 and the axis 302, an angle Y is formed by a line 303 connecting the third point V3 and the second point V2, and an angle Z is formed by the optical axis 301 and the line 303, and where the inclination angle W of the eye-piece barrel 20 is set within a scope from 20 to 45 degree, and the inclination angle U of the LCD color monitor 45 is set within a scope from 5 to 25 degree, the angle X shown in FIG. 5 is set at a value within a scope from 25 to 75.

On the other hand, the angle Y, which will vary depending on the positional relationship (relationship in height or their position) between the eye-piece barrel 20 and the electronic camera 45, is set within a scope from 20 to 60 degree, for example. The angle Z is calculated from the formula 180−(X+Y). To sum up, the scopes of these angles are represented as follows:

angle W=20°−45°
angle U=5°−25°
angle X=25°−70°
angle Y=20°−60°

Next, the electric circuit in the electronic camera 40 will be described below with reference to FIG. 6. The electronic camera 40 has a signal processing section 44 for processing the signal output from the imaging element (CCD) 43, and a display section 45. The processing section 44 is connected to a bus line 46, and controlled by a system controlling section 47 connected to the bus line 46. The bus line 46 is further connected to a recording medium (memory card) 49, a switch interface 48, and an external interface 50.

Figure 6:
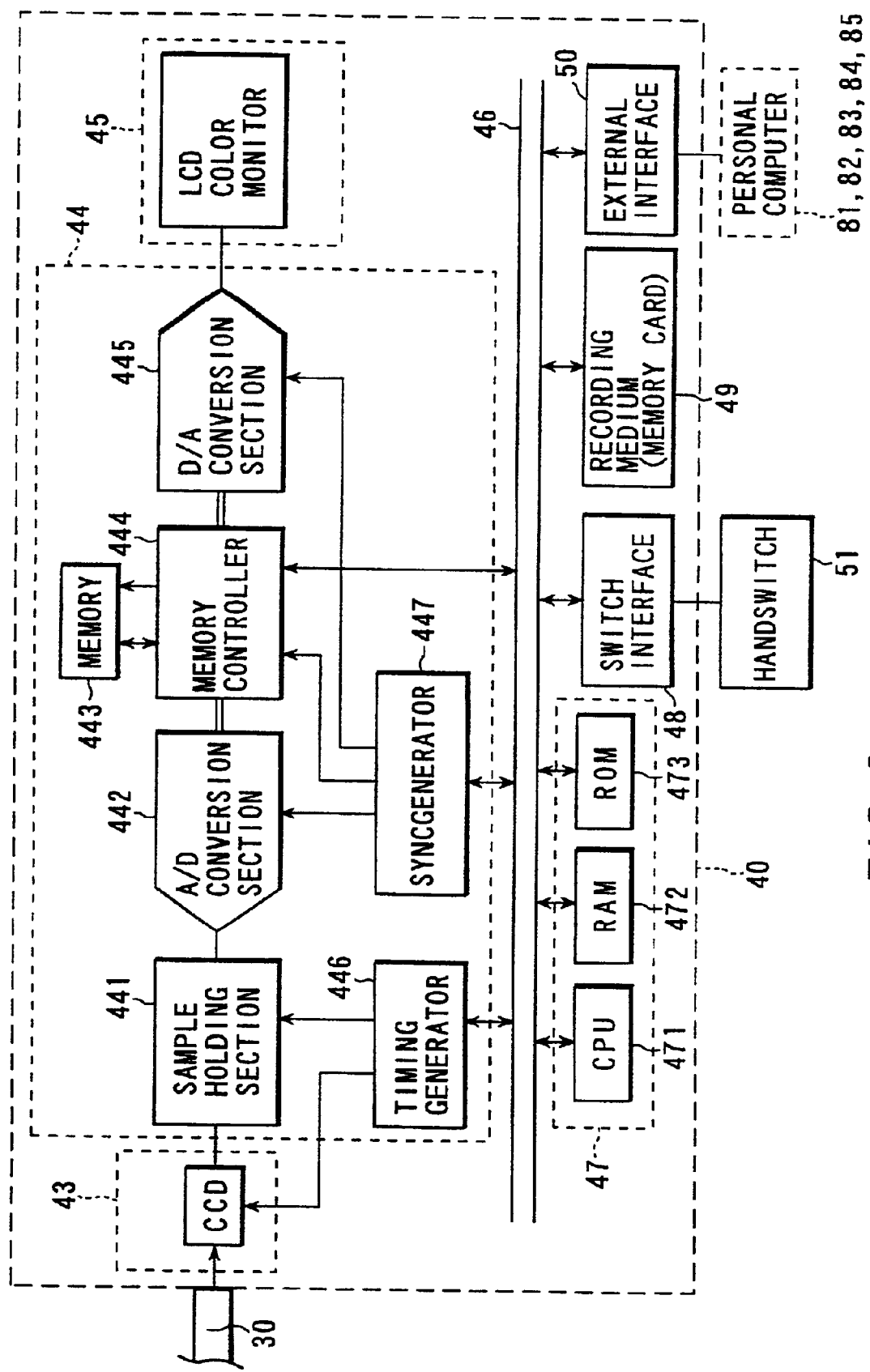
FIG. 6 is a block diagram of the electronic camera according to the first embodiment of the present invention.

As shown in FIG. 6, in the signal processing section 44, a sample holding section 441 for sampling a signal output from the CCD 43 as an imaging element, an A/D conversion section 442 for performing A/D conversion, a memory controller 444 for controlling input/output of data from/to a memory 443 for temporarily storing image data, and a D/A conversion section 445 for performing D/A conversion are connected in series to output the signal output from the CCD 43 to the LCD color monitor 45.

An output signal of a timing generator 446 is input into the CCD 43 and the sample holding section 441, and an output signal of a syncgenerator 447 is input into an A/D conversion section 442, a D/A conversion section 445, and a memory controller 444. The timing generator 446, the syncgenerator 447 are connected to the bus line 46, and output a timing signal in response to an instruction output from the system controlling section 47 via the bus line 46, thereby control the operations of the blocks.

The system controlling section 47 has a CPU 471, a ROM 473 storing an operation program, and a RAM 472 used for operations, which are connected to the bus line 46 independently. A CPU 471 executes various controls of the electronic camera 40 in accordance with operation program stored in the ROM 473.

The image data is stored/read in/from the recording medium (memory card) 49 via the bus line 46. The recording medium other than the memory card can also be used.

The switch interface 48 connects the handswitch 51 to the system controlling section 47 via the bus line 46, and sends various operation instructions such as releasing to the system controlling section 47 with use of the handswitch 51. The external interface 50 is provided to perform the data transmission from/to the external personal computer.

Next, the operation of the apparatus according to the first embodiment, which has the above-mentioned constitution, will be described below. The observation light from the specimen S illuminated by the transmission light or the projection light is collected by the objective lens 6 and incident into an optical path split prism 11 via a half mirror 8. At this time, the observation light is split into two directions. The observation light in one direction is directed to the eye-piece barrel 20, and directly observed by the observer 90 via the eyepiece lens 21. The observation light traveling in the other direction is guided to the electronic camera 40 through the television camera adapter 30 attached to a mount on an upper portion of a tri-metrogan barrel 10.

The observation light is incident into the CCD 43 in the electronic camera 40 to be converted into an electric signal. The signal is subjected to the processings of the sample holding circuit and the A/D conversion in order, and sent to the memory controller 444, and then temporarily stored in the memory 443. In displaying the signal in the LCD color monitor 45, the image data stored in the memory 443 is read by the memory controller 444 and subjected to the D/A conversion process, and sent to the LCD color monitor 45 to be displayed therein. In photographing the image, a photographing instruction is issued to the system controlling section 47 via the switch interface 48 by handling the handswitch 51 to perform the photographing. The image data is stored in the memory 443 or the recording medium (memory card) 49.

In this manner, according to the present embodiment, the image input into the electronic camera 40 is displayed by the LCD color monitor 45 in photographing by the electronic camera. The observer 90 watches through the eye-piece barrel 20 in the normal observation, and in photographing using the electronic camera, can perform the framing or the focusing of the image to be photographed merely by looking up the display without changing the pose.

Of course, the eyepiece lens 21 can have the focusing function of the electronic camera by adjusting the focal point with use of the focal point adjusting mechanism of the television camera adapter 30 in advance such that the focal points of the images in the eyepiece lens 21 and the LCD color monitor 45 correspond to each other. The television camera adapters 30 have various magnifications depending on the type of the adapter. Some type of adapter has a zooming function, and the framing cannot be performed with use of the eyepiece lens 21.

According to the present invention, the digital photographing can be attained with use of only the microscope provided with the electronic camera 40, and thus the personal computer 82 (together with the television monitor 81 and the key board 83) needs not to be located near the microscope. In short, in such a case that the fluoroscopy where the observation is performed in a darkroom, the area occupied by the apparatus in the darkroom is the minimum. When the photographed data is subjected to some process such as image processing, the process can be executed by inputting data read from a memory card storing the obtained image data into a personal computer located in a different place from the microscope.

When a printer 84 capable of outputting the read image data stored in the memory card to such a medium as paper, OHP sheet, or 35 mm film size slide, is connected to the apparatus, the data outputting process can be executed only with use of the printer if the image processing needs to be executed and merely the image data is printed out (in this case, the television monitor 81, the personal computer 82, and the key board 83 need to be provided). In this case, the memory card storing the image data is inserted into the slot 85 of the printer 84 to read or write data. Also in this case, the printer 84 needs not to be arranged near the microscope, of course.

The operation of the electronic camera 40 is executed with use of the handswitch 51, and the digital photographing data is stored in the memory device in the electronic camera 40. If the electronic camera 40 is connected to the personal computer 82 via the external interface 50, direct data transmission with the personal computer 82 can be attained or the electronic camera 40 can be operated with use of the personal computer 82. Also in this case, the personal computer 82 or the television monitor 81 need not to be arranged near the microscope body 1 in photographing, and thus the microscope body 1 can be arranged with a large surrounding space.

Further, the digital photographing can be executed by buying only the electronic camera 40 or the handswitch 51, and thus expensive personal computer 82 or television monitor 81 needs not to be bought if the image processing needs not to be executed. Accordingly, when the electronic camera is attached to the different microscope or the microscope located in the other room, the personal computer 82 or the television monitor 81 needs not to be moved to be connected to the microscope, and the setting can be easily performed. Depending on the sight angle, the brightness of the LCD color monitor 45 may be changed, and in some case, the LCD color monitor cannot be watched. By inclining the display monitor downward to face the observer 90, the line of the sight of the observer can be prevented from being oblique with respect to the LCD display, which makes the display difficult to be watched.

Figure 7:
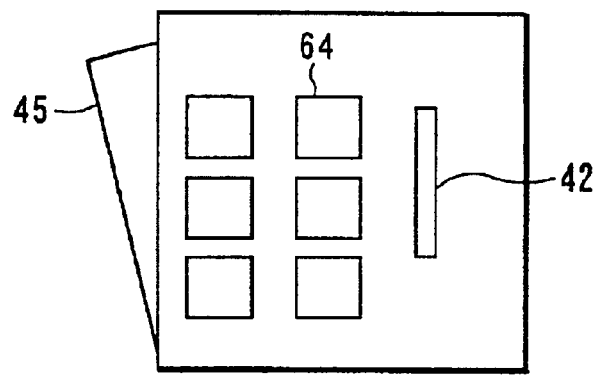
FIG. 7 is a side view showing a modification of the electronic camera according to the first embodiment of the present invention.

FIG. 7 shows one modification of the first embodiment. Generally, the electronic camera 40 is operated with use of the handswitch 51, or by connecting the apparatus with the personal computer 82 and inputting an instruction into the key board 83, or with use of an input device such as a mouse (not shown) of the personal computer 82. In any case, the electronic camera 40 is operated by connecting it to a cable, and thus the cable or the handswitch 51 may deteriorate the operability on the desk, thereby the advantage by attaining the compactness of the electronic camera may be deteriorated.

The apparatus shown in FIG. 7 is provided with an operation switch 64 on the side wall of the casing of the electronic camera 40, and thus the electronic camera system is simplified and made to be compact. The apparatus does not use the handswitch 51 or the personal computer 82 to release the switch, and is provided with a release switch at a position very near the LCD color monitor 45. With this constitution, the observer can perform the releasing operation immediately after the framing or the focusing while monitoring the display. By forming the releasing switch to be feather-touch, the vibration of the microscope body 1 due to the releasing operation, which results in a blurred photograph, can be prevented.

(Second Embodiment)

Figure 8:
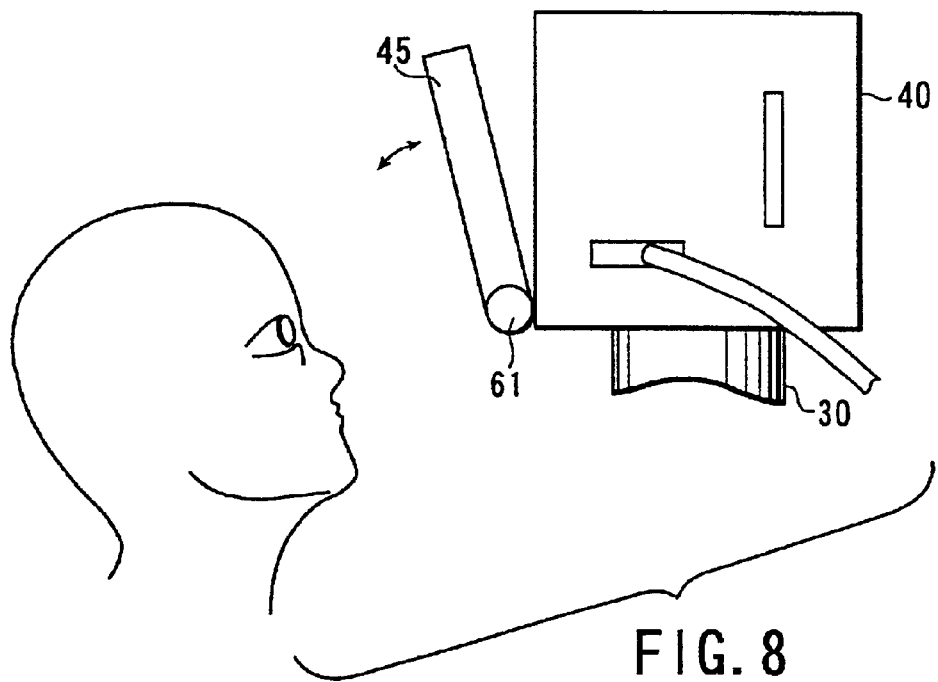
FIG. 8 is a side view of the electronic camera according to the second embodiment of the present invention.

FIG. 8 show the second embodiment. The electronic camera 40 fixed to the television camera adapter 30 has on the lower side on the observer 90 side a hinge member 61 having a suitable weight to change the angle of the LCD color monitor 45. The hinge member 61 connects the electronic camera 40 and the LCD color monitor 45, and thus the observer 90 can change freely the angle of the LCD color monitor 45 as indicated by an arrow by using the hinge member 61 as a fulcrum. The LCD color monitor 45 will not move after determining the angle since the hinge member 61 has a suitable weight.

The electronic camera 40 can be used for various microscopes, and the height at which the electronic camera is fixed is not constant. In the first embodiment, the angle of the LCD color monitor 45 is set to be constant. According to the present embodiment, when the height at which the electronic camera 40 is changed in view of the height of the observer 90 and the length of the television camera adapter 30, a clearer image can be obtained by finely adjusting the angle of the LCD color monitor 45, and thus is effective for a simple and precise framing and focusing.

(Third Embodiment)

Figure 9:
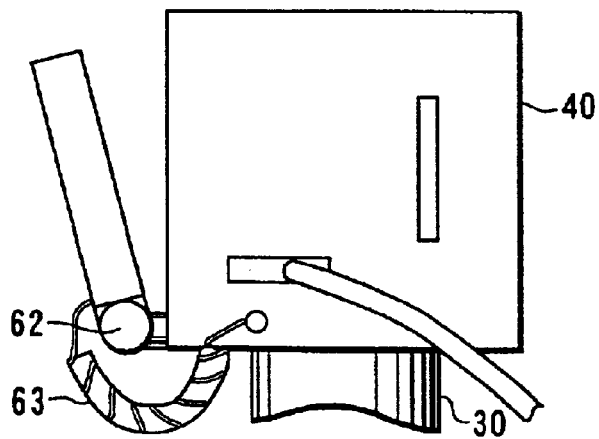
FIG. 9 is a side view of the electronic camera according to the third embodiment of the present invention.

FIG. 9 shows the third embodiment. The present embodiment is the same in the second embodiment in constitution wherein the LCD color monitor 45 is connected to the electronic camera 40 by the hinge member 62, and different from the second embodiment in the point that the second embodiment attains the electric connection of the LCD color monitor 45 and the electronic camera 40 by a cable (not shown) in the hinge member 61, while the third embodiment attains the electric connection of the LCD color monitor 45 and the electronic camera 40 by a curled code 63 outside.

Another difference from the second embodiment is that the LCD color monitor 45 is connected to the hinge member 62 detachably, and thus the observer 90 can change not only the angle but also the direction and position of the LCD color monitor 45 by detaching the LCD color monitor 45 from the hinge member 62, if necessary. This structure is effective for such an apparatus as an inverted microscope having on the side of the body a port (optical path) to which the television camera adapter 30 is fixed. In this case, the television camera adapter 30 and the electronic camera 40 can be attached to the body on the side, and thus the LCD color monitor 45 is made to be difficult to be watched. In such a time, by detaching the LCD color monitor 45 to change its direction and position such that the observer 90 can be easily watched, the framing or the focusing operation can be performed very easily. The LCD color monitor 45 can be easily fixed to the position at which the observer 90 can easily watch by providing fixing means such as a hook, a strap, or a magnet for adhering the LCD color monitor 45, or preparing a stand for the monitor. The curled code 63 is normally shrunk short, and can be extended in changing the position, and thus will not prevent any operation even if the hinge member 62 is fixed to the LCD color monitor 45.

(Fourth Embodiment)

Figure 10:
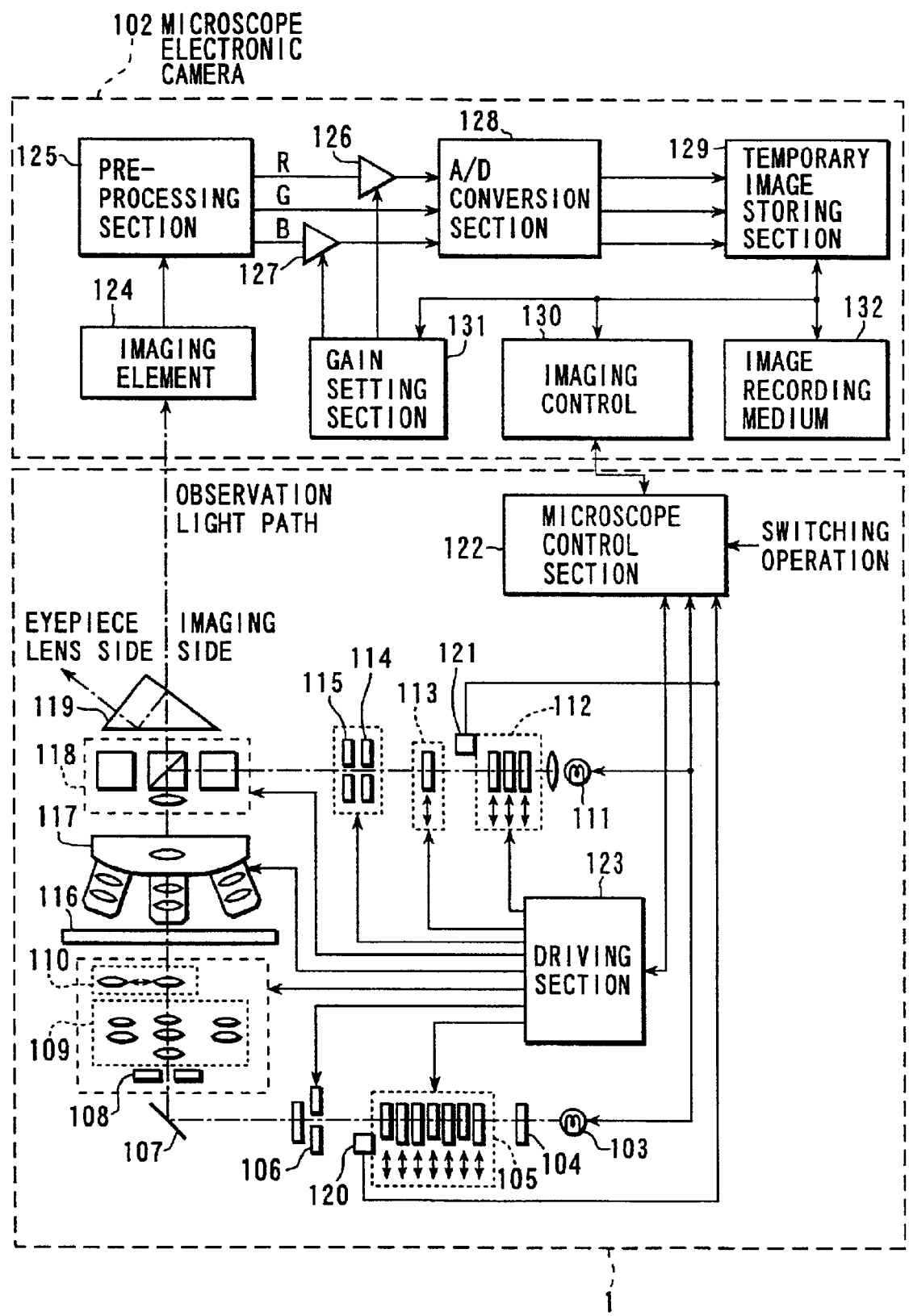
FIG. 10 is a block diagram showing a microscope electronic camera and microscope according to the fourth embodiment of the present invention.

Next, the fourth embodiment of the present invention will be described below. FIG. 10 shows the constitution of the microscope electronic camera. The microscope electronic camera 102 of the present embodiment is fixed to a microscope 101 having a function of changing the observation states for observing a specimen, and obtains the image observed by the microscope 101.

The microscope 101 is provided with a transmission light source 103 as a transmission observation optical system. On an optical path of the transmission light output from the transmission light source 103, there are provided a collector lens 104 for collecting transmission light output from the transmission light source 103; transmission observation filter unit 105 having a plurality of ND filters for adjusting light without changing the color temperature of the transmission light source 103 and a plurality of color temperature conversion filters for converting the illumination light color temperature; transmission field stop 106; and reflection mirror 107. Further, there are provided on a reflection optical path of the reflection mirror 107 a transmission aperture stop 108, condenser optical element unit 109, and a top lens unit 110.

On the other hand, there is provided a projection light source 111 as a projection observation optical system. On the optical path of the projection light output from the projection light source 111, a plurality of ND filters for light adjustment without changing the color temperature of the projection light source 111; a projection observation filter unit 112 comprising a plurality of color temperature conversion filters for converting the illumination light color temperature; a projection shutter 113; a projection field stop 114; and a projection aperture stop 115.

On the observation optical path on which the transmission observation path and the projection observation path are overlapped each other, a specimen stage 116 for mounting a specimen; a revolver 117 for selecting a plurality of objective lenses by the revolution; a cube unit 118 for switching observation methods; and a beam splitter 119 for splitting the optical path into the side of the eyepiece lens and the side of the imaging.

In the microscope having the above-mentioned structure, the transmission observation optical system is provided with a transmission light color temperature detection section 120, and the projection observation optical system is provided with a projection light color temperature detection section 121. The transmission light color temperature detection section 120 detects the color temperature of the transmission light irradiating the specimen. The projection light color temperature detection section 121 detects the color temperature of the projection light irradiating the specimen.

A microscope control section 122 serves to control the entire operation of the microscope 101, and is connected to the transmission light source 103, the projection light source 111, the transmission light color temperature detection section 120, the projection light color temperature detection section 121, and a driving section 123. The microscope control section 122 operates in accordance with the switching of the observation magnifications, light adjustment, the switching of the observation methods, and light adjustment control the transmission light source 103 or the projection light source 111, and controls the driving section 123.

The microscope control section 122 recognizes the change of the setting of the observation condition of the microscope 101 in response to the operation such as the switching of the observation magnifications, light adjustment, or the switching of the observation methods, and serves to send to the electronic camera 102 the color temperature information of the transmission light, which is detected by the transmission light color temperature detection section 120, or the color temperature information of the projection light, which is detected by the projection light color temperature detection section 121.

On the other hand, the electronic camera 102 is provided with an imaging element 124 for imaging the observation image from the microscope 101. The imaging element 124 is connected to a pre-processing section 125 at the output terminal. The pre-processing section 125 converts the output signal of the imaging element 124 into an image signal and separated to obtain RGB color signals. Among the outputs of the pre-processing section 125, an R output terminal and a B output terminal are connected to amplifying sections 126 and 127 for adjusting the white balances of the image signals, respectively. A G output terminal of the pre-processing section 125 and the output terminals of the amplifying sections 126 and 127 are connected to a temporary image storing section 129 through an A/D conversion section 128.

An imaging control section 130 controls the operation of the electronic camera 102, and is connected to a gain setting section 131, a temporary image storing section 129, an image recording medium 132, and a microscope control section 122 in a microscope 101. The gain setting section 131 serves to set gains of the amplifying sections 126 and 127.

The imaging control section 130 receives the color temperature information of the transmission light or the projection light, which is sent from the microscope control section 122, and serves to change the setting of the gain of the gain setting section 131 in accordance with the color temperature information.

Further, when a still image obtain instruction is issued, the imaging control section 130 serves to store image data stored in the temporary image storing section 129 in the image recording medium 132.

Next, the operation of the apparatus constituted as mentioned above will be described below.

In the case of the transmission bright-field observation, the observer performs the setting of the transmission bright-field, observation magnification, and light adjustment as an observation method in the microscope control section 122. The microscope control section 122 turns the transmission light source 103 on at the brightness set by the observer in accordance of the setting of the light adjustment. In this time, the projection light source 111 is turned off. Simultaneously, the microscope control section 122 issues a control instruction to the driving section 123 to subject the observation condition of the microscope 101 to the specified observation method and observation magnification.

The driving section 123 receives the control instruction from the microscope control section 122, and controls the revolver 117 to insert the objective lens having the specified observation magnification in the observation optical path, and drives the cube unit 118 for the transmission observation. The driving section 123 controls the transmission aperture stop 108, the condenser optical element unit 109, and the condenser top lens unit 110, and drives the transmission observation filter unit 105 and the transmission field stop 106.

On such an observation condition of the microscope 101, the transmission light output from the transmission light source 103 is collected by the collector lens 104, passes through the transmission observation filter unit 105 and the transmission field stop 106, and is reflected by the reflection mirror 107, and passes through the transmission aperture stop 108, the condenser optical element unit 109, and the top lens unit 110, and then irradiates the specimen located on the specimen stage 116.

In this time, the transmission light color temperature detection section 120 detects the color temperature of the transmission light to irradiate the specimen, and sends the color temperature information to the microscope control section 122.

The light transmits the specimen passes through the objective lens, the cube unit 118 and the beam splitter 119, and is projected onto the imaging element 124. The imaging element 124 light-electrically converts the projected image and outputs it. The pre-processing section 125 converts the output signal of the imaging element 124 into an image signal, separates the image signal into RGB color signals, and output them.

On the other hand, the microscope control section 122 recognizes the change of the setting of the observation condition in the microscope 101 in response to the operation such as the switching of the observation magnifications, light adjustment, or the switching of the observation methods, and sends the color temperature information of the transmission light, which is detected by the transmission light color temperature detection section 120 to the imaging control section 130.

The imaging control section 130 receives the color temperature information of the transmission light, which is sent from the microscope control section 122, and changes the setting of the gain of the gain setting section 131 so as to maintain the suitable white balance in accordance with the color temperature information. The gain setting section 131 sets the gain of the amplifying sections 126 and 127 at the changed gain.

On the other hand, an R color signal and a B color signal separated and output by the pre-processing section 125 are amplified by the gains the settings of which are changed by the amplifying sections 126 and 127, respectively. By doing this, the R color signal separated and amplified by the amplifying section 126, a G color signal separated and output by the pre-processing section 125, and the B color signal separated and amplified by the amplifying section 127 are prepared as image signals at a suitable white balance based on the color temperature of the transmission light irradiating the specimen.

The R, G, and B color signals are A/D converted by the A/D conversion section 128, and stored as image data in a temporary image storing section 129.

If the imaging control section 130 is controlled to execute an image recording operation in order to store the observed image as a still image in this time, the imaging control section 130 stores in the image recording medium 132 the image data stored in the temporary image storing section 129, as a still image.

Next, the case where the observer observes the same specimen under various observation magnifications in accordance with the same observation method, and stores the observed image as a still image will be described below.

The observer changes the setting of the observation magnification in the microscope control section 122. The microscope control section 122 issues a control instruction to the driving section 123 so as to set the observation condition of the microscope 101 at the observation magnification the change of which is instructed.

The driving section 123 receives the control instruction from the microscope control section 122, and drives the revolver 117 to insert the objective lens having the specified observation magnification into the observation optical path. Simultaneously, the driving section 123 drives the transmission aperture stop 108, the condenser optical element unit 109 and the condenser top lens unit 110 in accordance with the changed objective lens, if necessity.

If the light amount of the light irradiating the specimen is not changed when the magnification of the objective lens is changed, the specimen may not be observed at the optimum light amount. In this time, the observer can obtain the observation light amount suitable for the observation by changing the light amount of the transmission light source 103 or by inserting/extracting the filter in the transmission observation filter unit 105 into/from the optical path.

By performing such an operation with the microscope control section 122, the microscope control section 122 adjusts the light amount of the transmission light output from the transmission light source 103, and drives the transmission observation filter unit 105 via the driving section 123.

However, if such light adjustment is performed, the color temperature of the transmission light irradiating the specimen is made to be different from the color temperature before the adjustment. In this case, the transmission light color temperature detection section 120 detects the color temperature of the transmission light irradiating the specimen, and sends the color temperature information to the microscope control section 122, and thus the microscope control section 122 recognizes the change of the setting in the microscope 101 in response to the switching of the observation magnifications, and sends the color temperature information of the transmission light, which is detected by the transmission light color temperature detection section 120 to the imaging control section 130.

The imaging control section 130, similarly to the above, changes the settings of the gain of the amplifying sections 126 and 127 in response to the color temperature information so as to maintain a suitable white balance via the gain setting section 131. On the other hand, the R color signal and the B color signal separated and output by the pre-processing section 125 are respectively amplified by the gains the settings of which are changed by the amplifying sections 126 and 127, the R color signal amplified by the amplifying section 126, the G color signal separated and output by the pre-processing section 125, the B color signal amplified by the amplifying section 127 are prepared as an image signal set at a suitable white balance in accordance with the color temperature of the transmission light irradiating the specimen. When the image recording operation is performed with the imaging control section 130 in order to store the observed image as a still image, the imaging control section 130 stores in the image recording medium 132 the image data stored in the temporary image storing section 129, as a still image.

Next, the case where the observer observes the same specimen in accordance with the same observation method in the projection bright-field observation, and stores the observed image as a still image will be described below.

The observer changes the setting of the projection bright-field observation with the microscope control section 122. The microscope control section 122 issues a control instruction to the driving section 123, turns off the transmission light source 103, and controls the projection light source 111 to turn on at a predetermined light amount. The microscope control section 122 drives the projection observation filter unit 112, the projection shutter 113, the projection field stop 114 and the projection aperture stop 115 via the driving section 123, and sends the color temperature information of the transmission light, which is detected by the projection light color temperature detection section 121 to the imaging control section 130.

The imaging control section 130, in the same manner, changes the settings of the gains of the amplifying sections 126 and 127 via the gain setting section 131 so as to maintain a suitable white balance in accordance with the color temperature information. On the other hand, the R color signal and the B color signal separated and output by the pre-processing section 125 are amplified by the gains the settings of which are changed by the amplifying sections 126 and 127. The R color signal amplified by the amplifying section 126, the G color signal separated and output by the pre-processing section 125, and the B color signal amplified by the amplifying section 127 are prepared as image signals set at a suitable white balance in accordance with the color temperature of the transmission light irradiating the specimen. When the image recording operation is performed with the imaging control section 130 in order to store the observed image as a still image, the imaging control section 130 stores in the image recording medium 132 the image data stored in the temporary image storing section 129, as a still image.

In this manner, in the first embodiment, the color temperature detection sections 120 and 121 detects the color temperature of the light irradiating the specimen and the change of the observation condition of the change of the light adjustment is recognized, then the gain of the image signal of the electronic camera 102 is changed in accordance with the color temperature information of the light, which is detected by the color temperature detection sections 120 and 121. Thus, even if the changes of the settings of the observation magnification, light adjustment, further are changed, or the observation condition is changed from the transmission bright-field observation to the projection bright-field observation, or vice versa, the observer can automatically obtain an observed image at a suitable white balance without any adjustment of the image, and store it as a still image.

Further, in the first embodiment, when the observation magnification is changed, the light adjustment is performed by the observer's operation to the microscope control section 130. As another option, the observer may issue the instruction to the imaging control section 130 after the observation magnification is changed to read the image data stored in the temporary image storing section 129 such that the brightness of the image data is set at a suitable value. By controlling the imaging control section 130 in this manner, the observer can record a still image maintained at a suitable light amount and a suitable white balance only by performing the change of the observation magnification.

(Fifth Embodiment)

Next, the fifth embodiment of the present invention will be described below with reference to FIG. 11. The same portions in FIG. 11 as those shown in FIG. 10 are denoted by same reference numerals and the detailed description thereof will be omitted. Particularly, the microscope 1 has the same constitution as that shown in the FIG. 10, and will not be illustrated in any drawing.

Figure 11:
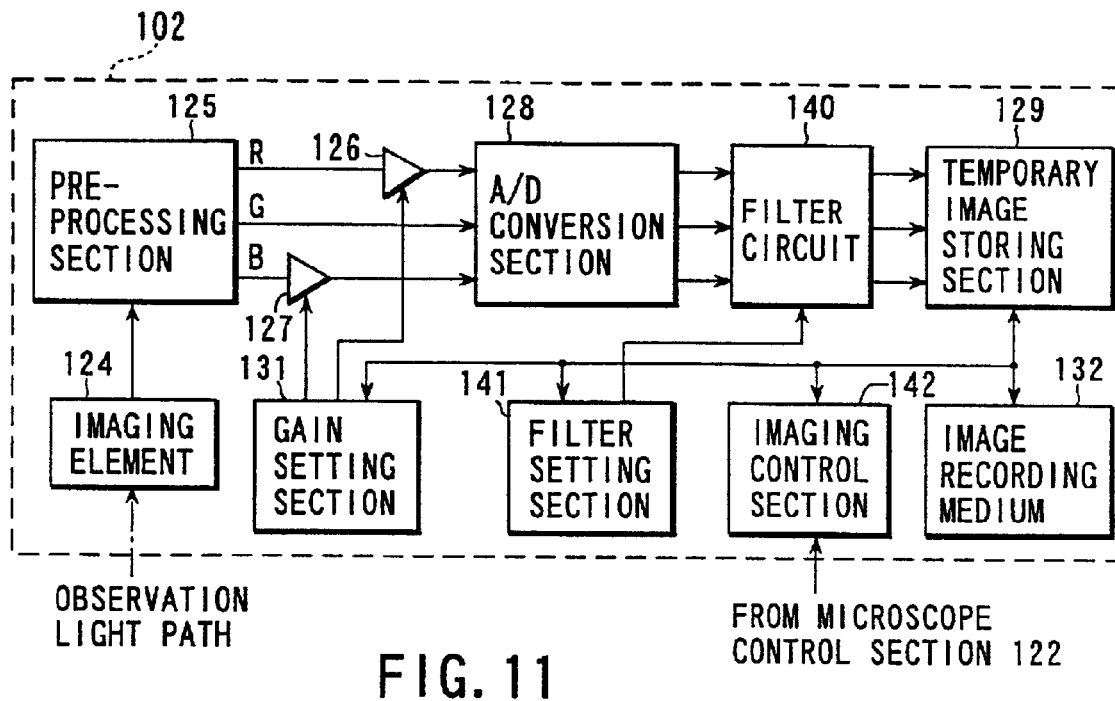
FIG. 11 is a block diagram showing a microscope electronic camera according to the fifth embodiment of the present invention.

FIG. 11 shows the constitution of a microscope electronic camera.

In an electronic camera 102, an A/D conversion section 128 and a temporary image storing section 129 are connected by a filter circuit 140 for executing contour accentuation for each of RGB color signals, and a filter setting section 141 sets a filter coefficient. The imaging control section 142 controls the operation of the electronic camera 102, and is connected to the gain setting section 131, the temporary image storing section 129, the image recording medium 132, the filter setting section 141, and the microscope control section 122 in the microscope 101.

The imaging control section 142 receives the observation magnification sent from the microscope control section 122 and the specimen change information, then changes the setting of the gain of the gain setting section 131 in accordance with the received information, and changes the setting of the filter coefficient to the filter setting section 141.

Next, the operation of the apparatus constituted as mentioned above will be described below.

When the transmission bright-field observation is performed, the operation will be performed in the same manner as performed in the first embodiment, and the description thereof will be omitted here. In the transmission bright-field observation, when the observation magnification is relatively high, the contour of the specimen can be clearly observed even on the predetermined observation condition of the microscope 1. On the other hand, the imaging control section 142 receives the observation magnification information sent from the microscope control section 122, and changes the setting of the gain of the gain setting section 131 in accordance with the received information, and controls the filter setting section 141 changes of the setting of the filter coefficient so as to be effective for the reduction noise included in the image.

On such an observation condition, the imaging element 124 light-electrically converts the projected observation image and outputs it, and the pre-processing section 125 processes the output signal of the imaging element 124 into an image signal, and separates the image signal into the RGB color signals and outputs it.

The R color signal and the B color signal separated and output by the pre-processing section 125 are amplified respectively by the gains changed by the amplifying sections 126 and 127. Thereby, the R color signal amplified by the amplifying section 126, the G color signal separated and output by the pre-processing section 125, the B color signal amplified by the amplifying section 127 are prepared as image signals maintained at a suitable white balance, in accordance with the color temperature of the transmission light irradiating the specimen.

Then, the R color signal, the G color signal, and the B color signal are A/D converted by the A/D conversion section 128, and the reduction of the noise included in the image data is performed by the filter circuit 140, and the resultant image data is stored in the temporary image storing section 129. The imaging control section 142 stores the image data stored in the temporary image storing section 129 in the image recording medium 132 to maintain it as a still image.

Next, the case where the observer observes the same specimen as a macro image in accordance with the same observation method, and stores the observed image as a still image will be described below.

In order to perform the macro observation, the observer controls the microscope control section 122 to set the observation magnification at a low level. The microscope control section 122 issues a control instruction to the driving section 123, drives the revolver 117 to insert the objective lens for the as a macro image observation magnification into the observation optical path, and also drives the cube unit 118, the transmission aperture stop 108, the condenser optical element unit 109, the condenser top lens unit 110, the transmission observation filter unit 105, and the transmission field stop 106.

The imaging control section 142 changes the gains of the amplifying sections 126 and 127 such that a suitable white balance is attained by use of the gain setting section 131 on the basis of the color temperature information detected by the transmission light color temperature detection section 120, and prepares the image signal as an image signal maintained at a suitable white balance in accordance with the color temperature of the transmission light irradiating the specimen.

According to the macro observation, the contour of fine portion of the specimen may not be clearly observed. In this case, the imaging control section 142 receives the information indicating the change of the observation magnification or the specimen from the microscope control section 122, and controls the filter setting section 141 to changes the filter coefficient to accentuate the contour in accordance with the received information.

On the other hand, the R color signal, the G color signal, and the B color signal maintained at a suitable white balance in accordance with the color temperature of the transmission light irradiating the specimen are subjected to the A/D conversion by the A/D conversion section 128, and subjected to the contour accentuating process by the filter circuit 140 thereafter, and then stored as image data in the temporary image storing section 129. The imaging control section 142 stores the image data stored in the temporary image storing section 129 in the image recording medium 132, as a still image.

In the above description, the contour of the stored image is automatically corrected by changing the observation magnification. On the other hand, the contour correction suitable for the type of the specimen can be performed by setting in the microscope control section 122 the types of the specimen to be observed.

For example, an enzyme antibody as one of specimens is difficult to observe since the contour of the observed image thereof is not so clear according to the normal observation. In order to improve it, not only the observation condition by the microscope 1 but also the type of the specimen are set in the microscope control section 122. The microscope control section 122 sends the specimen type information to the imaging control section 142, thereby the imaging control section 142 sets in the filter setting section 141 a filter coefficient capable of accentuating the contour such that the enzyme antibody can be suitably observed in accordance with the specimen type information. In this manner, the observer can store the observed image automatically subjected to the contour correction without the image adjustment due to difference of the type of the specimen.

As described above, according to the second embodiment, when the change of the observation magnification or the specimen is recognized, the image signal in the electronic camera 102 is subjected to the contour accentuation by changing the filter coefficient of the filter circuit 140. Even if the specimen is changed to an enzyme antibody or the like, the observation image is automatically subjected to the contour correction without any adjustment of the image, which is made to be necessary due to the type of the specimen. Similarly, even if the observation condition such as the observation magnification is changed, the observer can automatically obtain an image set at a suitable white balance without adjusting the image, and record it as a still image.

(Sixth Embodiment)

Next, the sixth embodiment will be described below with reference to FIG. 12. The same portions in FIG. 12 as those shown in FIGS. 10 and 11 are denoted by same reference numerals and the detailed description thereof will be omitted. Particularly, the microscope 1 has the same constitution as that shown in the FIGS. 10 and 11, and will not be illustrated in any drawing.

Figure 12:
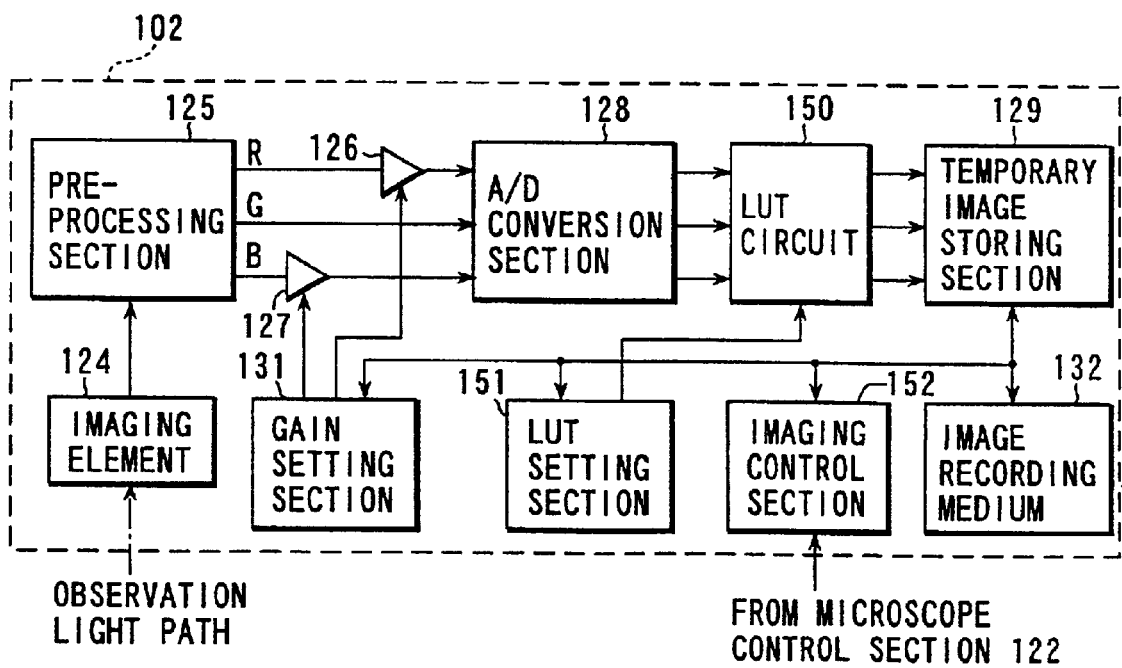
FIG. 12 is a block diagram showing a microscope electronic camera according to the sixth embodiment of the present invention.

FIG. 12 shows the constitution of a microscope electronic camera.

The A/D conversion section 128 and the temporary image storing section 129 in the electronic camera 102 are connected by a LUT circuit 150 having a tone level conversion table for performing the tone correction for RGB color signals as the image signal of the electronic camera. With use of the conversion table, the tone level of the image signal is changed. The conversion table is set by a LUT setting section 151.

The imaging control section 152 controls the operation of the electronic camera 102, and is connected to the gain setting section 131, the temporary image storing section 129, the image recording medium 132, the LUT setting section 151 and the microscope control section 122 in the microscope 101.

The imaging control section 152 receives the illumination light color temperature information, the observation method information, and the specimen change information from the microscope control section 122, and changes the setting of the gain of the gain setting section 131 in accordance with the received information, and changes the setting of the conversion table of the LUT setting section 151.

Next, the operation of the apparatus constituted as described above will be described below.

At first, the case where the fluoroscopy is performed and the image obtained by the observation will be described below.

The observer controls the microscope control section 122 to change the setting of the fluoroscopy. The microscope control section 122 issues a control instruction to the driving section 123, thereby controls the projection light source 111 to turn on at a predetermined light amount. The microscope control section 122 further executes the control such that the cube unit 118 is observed by desired excitation light among the projection light projected by the projection light source 111, and drives the projection filter unit 112, the projection shutter 113, the projection field stop 114, and the projection aperture stop 115, and sends the color temperature information of the projection light, which is detected by the projection light color temperature detection section 121 to the imaging control section 152.

Further, the microscope control section 122 sends the information of the fluoroscopy as a specific observation method to the imaging control section 152. The imaging control section 152 controls the LUT setting section 151 in accordance with the observation method information to set the conversion table such that an image having a suitable brightness can be attained. In this manner, a conversion table, for example, which sets the low-brightness portion which is not made luminous by the excitation light at a lower brightness level and sets a middle-brightness portion at a higher brightness level, is set in the LUT circuit 150.

On the other hand, the imaging element 124 outputs the projected observation image after light-electrical conversion, and the pre-processing section 125 converts the output signal of the imaging element 124 into an image signal, and separates it into RGB color signals to output them. The R color signal and the B color signal separated and output by the pre-processing section 125 are amplified by the gain the setting of which is changed by the amplifying sections 126 and 127, the R color signal amplified by the amplifying section 126, the G color signal separated and output by the pre-processing section 125, and the B color signal amplified by the amplifying section 127 are prepared as an image signal set at a suitable white balance in accordance with the color temperature of the transmission light irradiating the specimen.

The R color signal, the G color signal, and the B color signal are subjected to the A/D conversion by the A/D conversion section 128, and then the tone level thereof is changed by the LUT circuit 150. By doing this, the image data the noise of the portion which is not made luminous by excitation light is suppressed, thereby only the tone correction by which the luminous portion can be clearly observed. The image data is stored in the temporary image storing section 129. The imaging control section 152 stores image data stored in the temporary image storing section 129 in the image recording medium 132 to maintain it as a still image.

Next, the case where the observation method is changed to the transmission observation or the projection bright-field observation and the observed image is stored as a still image will be described below.

The observer controls the microscope control section 122 to change the setting of the projection bright-field observation, for example. The microscope control section 122 issues to the driving section 123 a control instruction of turning the projection light source 111 with a predetermined light amount, and executes the control such that the cube unit 118 is observed with use of the projection light emitted from the projection light source 111, drives the projection filter unit 112, the projection shutter 113, the projection field stop 114 and the projection aperture stop 115, and sends the color temperature information of the projection light, which is detected by the projection light color temperature detection section 121, to the imaging control section 152.

Further, the microscope control section 122 sends the information of the projection bright-field observation as the specified observation method to the imaging control section 152. The imaging control section 152 controls the LUT setting section 151 to set a conversion table by which an image of a suitable brightness in accordance with the observation method information. By setting in this manner, the conversion table by which the brightness level of a low-brightness portion to a middle-brightness portion is set higher, thereby a dark portion can be observed, is set in the LUT circuit 150.

On the other hand, the imaging element 124 light-electrically converts the projected observation image and outputs it, the pre-processing section 125 turns the output signal of the imaging element 124 into an image signal, separates it into RGB color signals, and output them. The R color signal and the B color signal separated and output by the pre-processing section 125 are respectively amplified by the gain the setting of which is changed by the amplifying sections 126 and 127, the R color signal amplified by the amplifying section 126, the G color signal separated and output by the pre-processing section 125, and the B color signal amplified by the amplifying section 127 are prepared an image signal set at a suitable white balance in accordance with the color temperature of the transmission light irradiating the specimen.

The R color signal, the G color signal, and the B color signal are subjected to the A/D conversion by the A/D conversion section 128, then the LUT circuit 150 changes the tone level thereof. By changing the tone level in this manner, the image data is subjected to the tone correction such that the image can be observed in the projection bright-field. The image data is stored in the temporary image storing section 129. The imaging control section 142 stores the image data stored in the temporary image storing section 129 in the image recording medium 132 to maintain it as a still image.

As described above, according to the third embodiment, when the change of the observation method is recognized, the image signal of the electronic camera 102 is subjected to the tone correction, and thus the tone correction is automatically executed for the image signal, thereby the optimum observation image can be attained, even if the observation method is changed to the transmission or projection bright-field observation.

(Seventh Embodiment)

The seventh embodiment of the present invention will be described below with reference to FIG. 13. The same portions in FIG. 13 as those shown in FIGS. 10, 11 and 12 are denoted by same reference numerals and the detailed description thereof will be omitted. Particularly, the microscope 1 has the same constitution as that shown in the FIGS. 10, 11, and 12, and will not be illustrated in any drawing.

Figure 13:
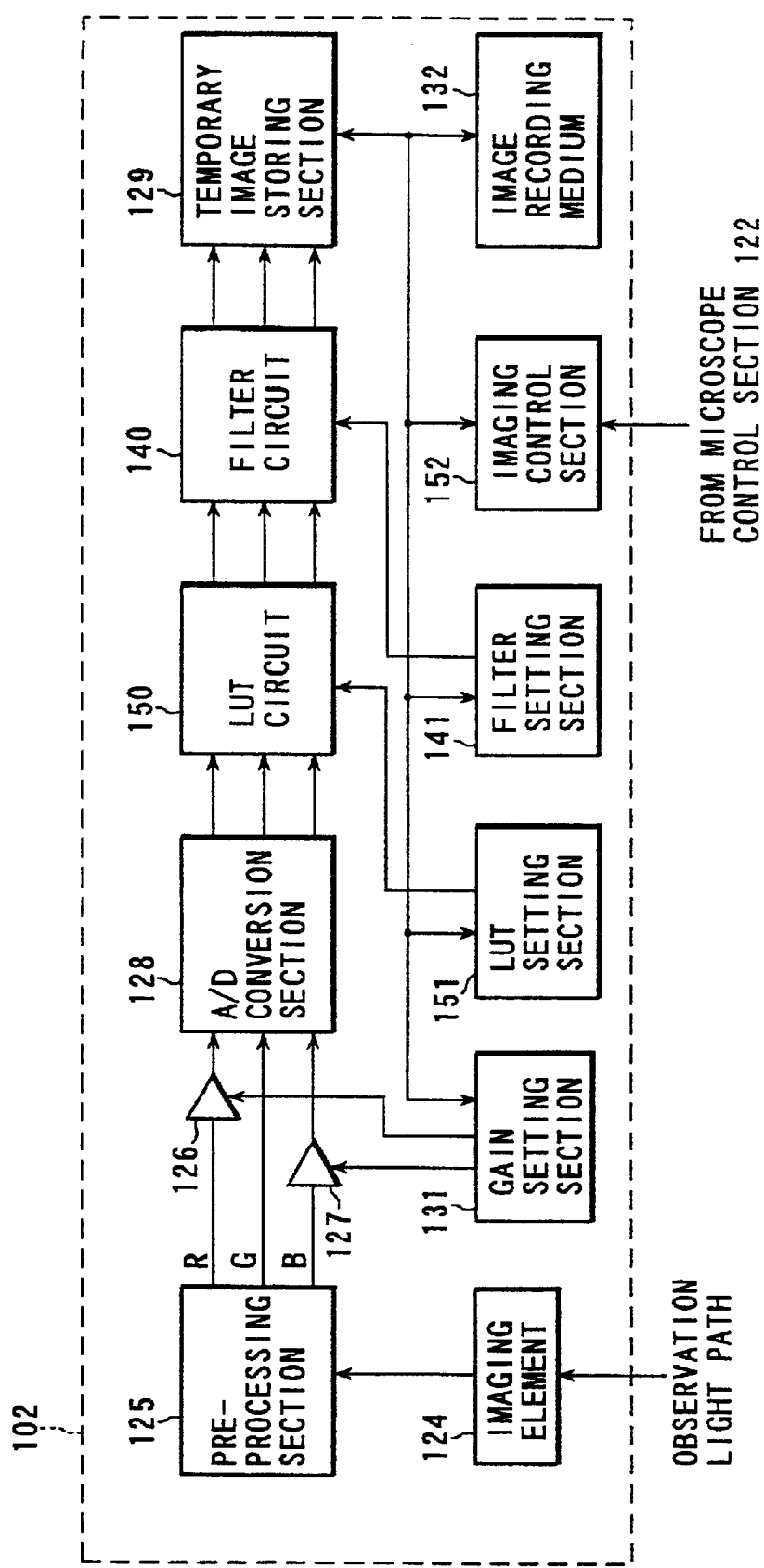
FIG. 13 is a block diagram showing a microscope electronic camera according to the seventh embodiment of the present invention.

As shown in FIG. 13, the apparatus of the seventh embodiment of the present invention is formed to add the filter setting section 141 and the filter circuit 140 to the apparatus of the sixth embodiment of the present invention.

With this constitution, the illumination light color temperature information, the observation method information, or the specimen change information is received, and in accordance with the information, the settings of the gain of the gain setting section 131 and the conversion table of the LUT setting section 151 can be changed, in addition, the filter coefficient effective for accentuating a contour at a level suitable for the observation of enzyme antibody can be set in the filter setting section 141 in accordance with the specimen type information. Therefore, the observer can store an observation image automatically subjected to the contour correction, without any image adjustment suitable for the type of the specimen.

(Eighth Embodiment)

Next, the eighth embodiment of the present invention will be described below with reference to FIG. 14. The same portions in FIG. 14 as those shown in FIG. 10 are denoted by same reference numerals and the detailed description thereof will be omitted. Particularly, the microscope 1 has the same constitution as that shown in the FIG. 10, and will not be illustrated in any drawing.

Figure 14:
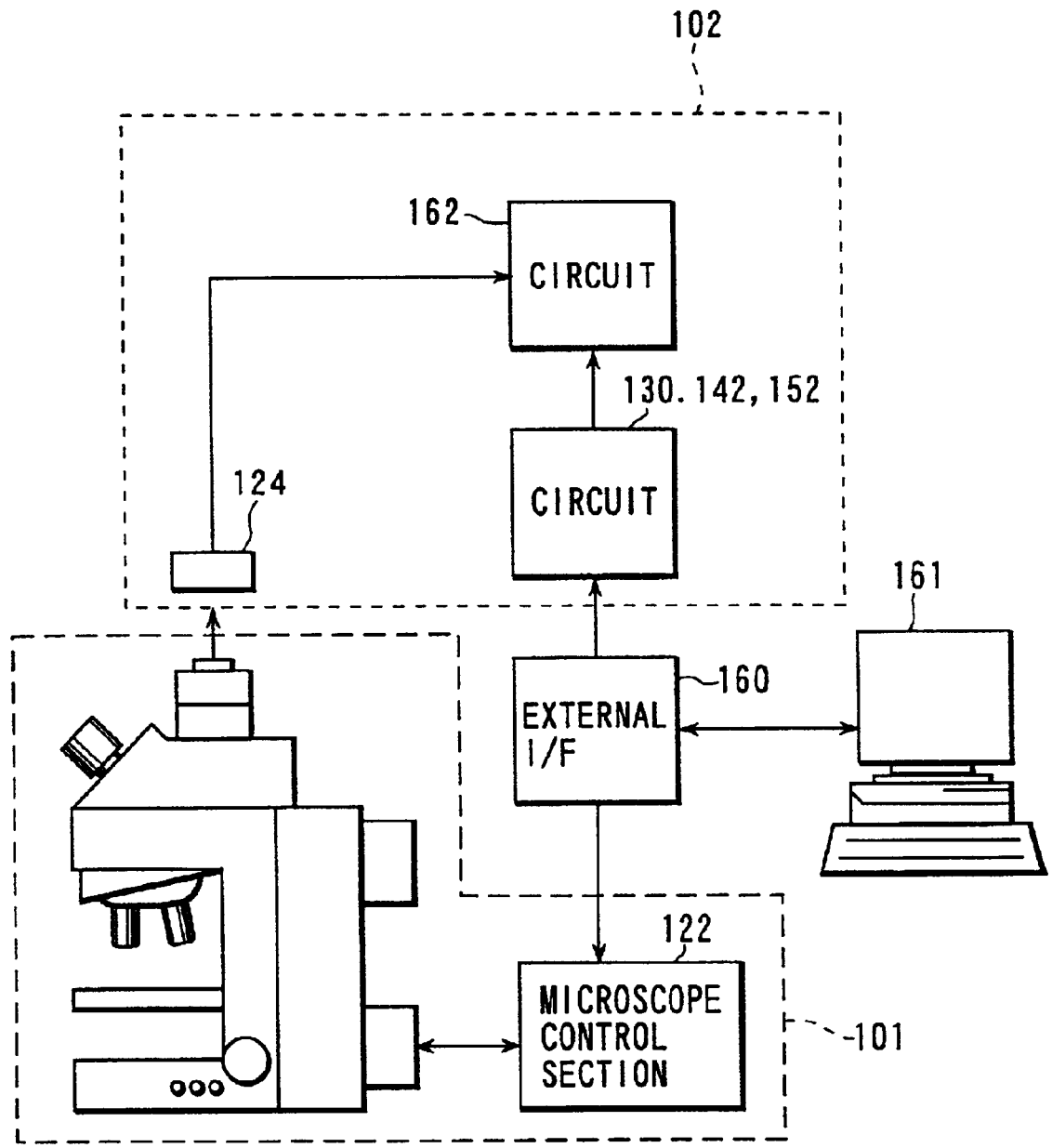
FIG. 14 is a block diagram showing a microscope electronic camera according to the eighth embodiment of the present invention.

As shown in FIG. 14, an external interface 160 connects the microscope control section 122 and the imaging control sections 130, 142, and 152. A personal computer (PC) 161 may be connected thereto. With use of the personal computer 161, the setting of the observation condition of the microscope 101 or a recording instruction to the electronic camera 102 may be sent to the microscope control section 122 or the imaging control section 130, 142, and 152 via the external interface 160. Reference numeral 162 denotes a circuit totally including the pre-processing section 125, the amplifying sections 126 and 127, the temporary image storing section 129, the gain setting section 131, the image recording medium 132, and the filter circuit 140, the filter setting section 141, the LUT circuit 150, and the LUT setting section 151.

(Ninth Embodiment)

Next, the ninth embodiment of the present invention will be described below with reference to FIGS. 15 and 16. The same portions in FIGS. 15 and 16 as those shown in FIGS. 6 and 10–13 are denoted by same reference numerals and the detailed description thereof will be omitted.

Figure 15:
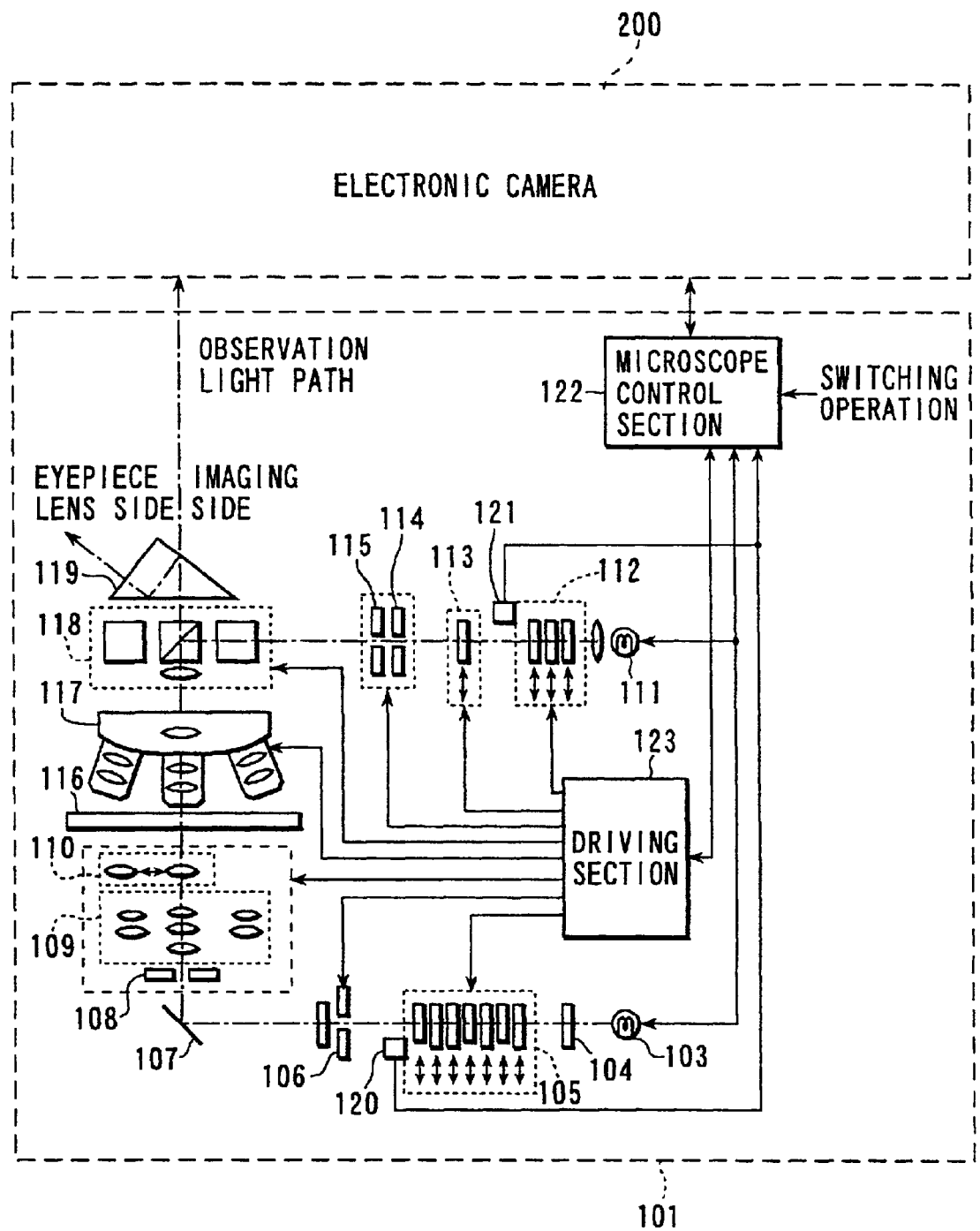
FIG. 15 is a block diagram showing a microscope electronic camera according to the ninth embodiment of the present invention.
Figure 16:
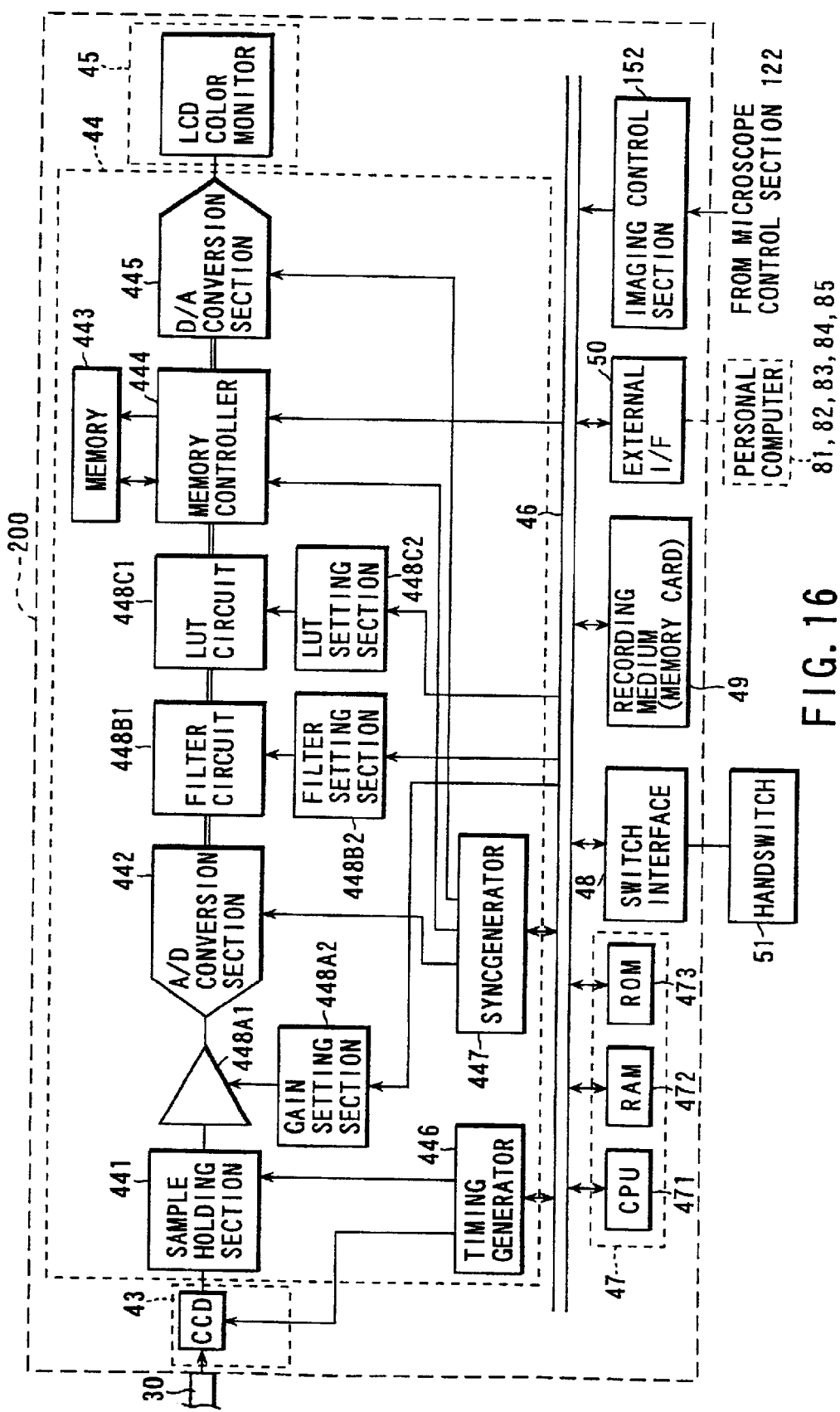
FIG. 16 is a block diagram showing the microscope electronic camera shown in FIG. 15.

As shown in FIGS. 15 and 16, an electronic camera 200 according to the ninth embodiment of the present invention is constituted such that the amplifying section 448A1, the gain setting section 448A2, filter circuit 448B1, the filter setting section 448B2, the LUT circuit 448C1, the LUT setting section 448C2, and the imaging control section 152 are added to the electronic camera 40 shown in FIG. 6.

With this constitution, the same effect as the advantage of the first embodiment can be attained, that is, the observer watching an image through the eyepiece lens 21 can perform the framing or the focusing in photographing merely by a little looking up without moving and by actuating the handswitch 51 while watching the image of the LCD color monitor 45, to obtain a digital photographing.

In accordance with the received illumination light color temperature information, observation method information, or specimen change information, the setting of the gain of the gain setting section 448A2 can be changed.

Further, the setting of the conversion table of the LUT setting section 448C2 can be changed.

Still further, in accordance with the specimen type information, the filter coefficient effective for the accentuation of the contour thereof, which is suitable for the observation of enzyme antibody, can be set in the filter setting section 448B2, and the observer can record the observation image automatically subjected to the contour correction without any image adjustment suitable for the type of the specimen.

As described above, according to the present invention, an electronic camera system for a microscope, which occupies only a small space, can be provided with a low cost, and the framing or the focusing in photographing can be easily performed with high precision.

Further, according to the present invention, a microscope electronic camera capable of obtaining the optimum image in accordance with the observation condition of the microscope or the specimen to be observed, can be provided.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope electronic camera for a microscope having a function of changing a setting of an observation condition of a specimen, said microscope electronic camera comprising:

an imaging element which obtains an observation image of the specimen;

recognizing means for, when the setting of the observation condition in the microscope is changed, recognizing changed setting information, and also for recognizing magnification/specimen change information relating to at least one of a change of observation magnification and a change of the specimen;

color signal processing means for processing a color image signal output from the imaging element in accordance with the changed setting information recognized by the recognizing means; and filter coefficient setting means, connected to the color signal processing means, for setting a filter coefficient which accentuates a contour of each of color signals as the processed color image signal for suitable observation, in accordance with the magnification/specimen change information recognized by the recognizing means.

2. A microscope electronic camera for a microscope having a function of changing a setting of an observation condition of a specimen, said microscope electronic camera comprising:

an imaging element which obtains an observation image of the specimen;

a microscope control section configured to, when the setting of the observation condition in the microscope is changed, recognize changed setting information, and also configured to recognize magnification/specimen change information relating to at least one of a change of observation magnification and a change of the specimen;

a color image control section configured to process a color image signal output from the imaging element in accordance with the changed setting information recognized by the microscope control section; and a filter circuit which is connected to the color image control section and which accentuates a contour of each of color signals as the processed color image signal for suitable observation, in accordance with the magnification/specimen change information recognized by the microscope control section.

3. The microscope according to claim 2, further comprising:

filter coefficient setting means for setting a filter coefficient of the filter circuit in accordance with the magnification/specimen change information recognized by the microscope control section.

4. A microscope electronic camera having a function of changing a setting of an observation condition of a specimen, said microscope electronic camera comprising:

an imaging element which obtains an observation image of the specimen;

recognizing means for, when the setting of the observation condition in the microscope is changed, recognizing changed setting information, and also for recognizing magnification/specimen change information relating to at least one of a change of observation magnification and a change of the specimen;

color signal processing means for separating a color image signal output from the imaging element into color signals in accordance with the changed setting information recognized by the recognizing means;

a filter circuit which executes contour accentuation for each of the color signals; and filter coefficient setting means, connected to the filter circuit, for setting a filter coefficient which accentuates a contour of each of the color signals for suitable observation, in accordance with the magnification/specimen change information recognized by the recognizing means.

* * * * *